United States Patent [19]
Heinrich et al.

[11] Patent Number: 5,568,729
[45] Date of Patent: *Oct. 29, 1996

[54] MACHINE AND METHOD FOR MAKING HARDENED CONFECTIONS HAVING COMPLEMENTARY PARTS JOINED IN A UNIT

[75] Inventors: David B. Heinrich, Battle Creek, Mich.; Jack D. Spencer, Westerville, Ohio

[73] Assignee: Nestec, Ltd., Vevey, Switzerland

[*] Notice: The term of this patent shall not extend beyond the expiration date of Pat. No. 5,447,036.

[21] Appl. No.: 452,148

[22] Filed: May 26, 1995

Related U.S. Application Data

[63] Continuation-in-part of Ser. No. 206,388, Mar. 4, 1994, Pat. No. 5,435,143, and Ser. No. 226,494, Apr. 12, 1994, Pat. No. 5,447,036.

[51] Int. Cl.⁶ ........................................ A23G 9/26
[52] U.S. Cl. ............................ 62/75; 62/345; 425/126.2; 426/101
[58] Field of Search .................... 62/25, 345; 425/126.2, 425/134, 259, 261; 426/100, 101, 134, 249, 515, 524

[56] References Cited

U.S. PATENT DOCUMENTS

| | | | |
|---|---|---|---|
| 4,986,080 | 1/1991 | Grigoli et al. | 62/75 |
| 5,435,143 | 7/1995 | Heinrich | 62/75 |
| 5,447,036 | 9/1995 | Heinrich | 62/75 |

OTHER PUBLICATIONS

Gram, product brochure, "—leading the world in refrigeration", 93 08 6,000 GB.

Gram, product brochure, Ice cream, Automatic Rotary Novelty Freezes, RIA, 7.46.60 2000 GB Nov. 1989.

Alfa–Laval/Hoyer, product brochure, Ice Cream Equipment, No. SY 80040 E, Reg. OGA1 91.05 5,000.

*Primary Examiner*—William E. Tapolcai
*Attorney, Agent, or Firm*—Porter, Wright, Morris & Arthur

[57] ABSTRACT

A machine and method for making unit confections of shaped complementary parts which consist of different recipes, flavors, colors, textures and/or mix inclusions having groups of complementary molds, in which a group of first molds produces physical shapes which displace at least a portion of the product in a group of second molds to produce complementarily joined shaped confections produced in the group of second molds.

19 Claims, 7 Drawing Sheets

MACHINE AND METHOD FOR MAKING HARDENED CONFECTIONS HAVING COMPLEMENTARY PARTS JOINED IN A UNIT

RELATED APPLICATIONS

This is a continuation-in-part of application for U.S. patent Ser. No. 08/206,388, filed on Mar. 4, 1994 (now allowed, issue fee paid on Feb. 21, 1995), now U.S. Pat. No. 5,435,143, and co-pending application for U.S. patent Ser. No. 08/226,494, filed on Apr. 12, 1994 (indicated to be allowable and prosecution now closed),now U.S. Pat. No. 5,447,036, both having the common assignee of the present invention and both incorporated herein by reference for all purposes.

FIELD OF THE INVENTION

This invention relates to a machine and method for making hardened confections of physically joined complementary parts which consist of different recipes, flavors, colors, textures and/or mix inclusions. The parts have complementary shapes which are joined in a resulting confection unit. The confection units are frozen or hardened confections or ices which may be flavored ice, ice cream, frozen yogurt, sherbet, sorbet and the like, known in the industry generically as "frozen confections," "hardened confections" or "ices."

BACKGROUND AND SUMMARY OF THE INVENTION

Chain-conveyor parallel row machines having parallel rows of molds and rotary table machines having concentric groups of molds for making ice confections are known in the art. A chain-conveyor parallel row machine has molds arranged in parallel rows which are caused to linearly advance through a freezing tank by means of a conveying chain. An example of such a machine is shown in U.S. Pat. No. 4,759,197. A rotary table molding machine having groups of molds for making ice confections uses groups of molds which are caused to rotatably advance through a freezing tank by means of a circular mold table.

These known types of machines permit certain types of diversified products to be obtained during a work cycle. Multiple-flavored ice confections can be produced as layers of different flavored ices which are obtained by filling molds in successive steps with different products, as the molds advance in a production cycle. Such machines are also capable of producing "shell and core" confections in which the "core" is removed by suction before it solidifies but after the "shell" solidifies. Another product is then introduced into the resulting space within the shell.

U.S. Pat. No. 4,986,080 ("the '080 patent") discloses a chain-conveyor parallel row machine having parallel rows of molds and a method of producing double-flavor ices. The '080 patent is a particular adaptation of the machine disclosed in U.S. Pat. No. 4,759,197. The '080 patent discloses a machine in which parallel rows of molds are intermittently advanced through a freezing section by means of a conveying chain. The parallel rows of molds differ in shape, one row to the next, such that the cross-sections of molds of some rows are stated to be "inscribable" into the cross-sections of molds in other rows. The '080 patent includes metering-filling units, a stick-inserting unit and withdrawing devices such as are known in the art.

In general, chain-conveyor parallel row machines have certain operational disadvantages. These include: inefficient mold utilization, resulting from fewer than 50% of all molds being in use at any time; inefficient floor plan utilization, resulting from the complete machine having a significant length; poor repeatability of mold positioning, resulting from variations in conveyor chain pitch dimensions due to wear; and incomplete sealing of the mold area from the freezing area, resulting from jointed, articulated construction inherent in a chain conveyor.

Rotary machines resolve several of these difficulties. Molds are located in a circular unitized mold table that effectively seals the product from the mold chilling brine, which is a hygienic advantage. The chain-conveyor parallel row machines carry molds in a jointed, articulating conveyor that is difficult to seal in order to avoid product contamination by the mold chilling brine. Also, unlike the rotary table machine, the chain-conveyor parallel row machine requires that molds be returned to the "start" position by passing molds upside down under the machine typically through an energy and water consuming washing system. The manner of returning molds to the start position results in a mold utilization factor of less than 50%, whereas a mold utilization factor for rotary table machines can be higher than 75%. Mold utilization factor is important because molds are expensive.

An example of a rotary machine and method for making hardened confections having complementary parts joined in a unit is fully described in co-pending application for U.S. patent Ser. No. 08/206,388 and co-pending application for U.S. Ser. No. 08/226,494, both having the common assignee of the present invention both incorporated herein by reference for all purposes.

A machine and method is provided for making unitized confections of complementary parts in an efficient manner that overcomes problems of the chain-conveyor parallel row machines and achieves the advantages incident to rotary design. In one embodiment, the invention is a rotary machine having at least two groups of complementary molds arranged concentrically on a rotating table. The first concentric mold group produces physical shapes which complementarily join with all or part of the shapes produced in the second concentric mold group. The shapes produced by the first mold group are introduced into the molds of the second group and a unitized confection of two parts results. The first and second mold groups are aligned essentially radially with respect to the rotating table. The resulting confections can each have two or more complementary parts of different recipes, flavors, colors, textures and/or mix inclusions; and the complementary parts may be visually and/or gustatorily distinct in the confection unit.

In another embodiment, the invention is a rotary machine having at least two groups of complementary molds arranged radially in sectors of a rotating table. The first mold group produces physical shapes which complementarily join with all or part of the shapes produced in the second mold group. The shapes produced by the first mold group are introduced into the molds of the second group and a unitized confection of two parts results. The first and second mold groups are aligned as a paired group essentially radially with respect to the rotating table. The resulting confections can each have two or more complementary parts of different recipes, flavors, colors, textures and/or mix inclusions; and the complementary parts may be visually and/or gustatorily distinct in the confection unit.

This invention includes at least one solidifying (i.e., hardening or freezing) section through which each of the groups of complementary molds are advanced by rotation. The molds may be advanced in a unitized table configuration by a drive mechanism for rotatably advancing the paired groups of molds about an axis. The molds of the respective groups determine the complementary shapes that form the finished confection unit. A first filling unit is provided to introduce a first product into the first molds. Sticks are inserted into the product in the first molds. The molded product from the first molds is sized such that it fits within the second molds.

A second filling unit is provided to introduce a second product differing from the first product into the second molds. One embodiment of the present invention enables the second molds to be filled with a quantity of a second product before, during and/or after the first solidified molded product is introduced into the second molds. The second molds are filled with a volume of second product to fill the volume of the second mold in a measure determined approximately by the volume of the second mold less the predetermined volume of the mold in the first group. When the molded first product is introduced into the second molds containing flowable second product, the molded first product displaces the second product to fill the spaces in the second molds.

In one embodiment, after the product in the first molds solidifies, a withdrawing and transfer mechanism withdraws the solidified product from the first molds and transfers the molded product essentially radially to the second molds. In another embodiment, after the product in the first molds solidifies, a withdrawing mechanism withdraws the solidified product from the first molds, waits until the second molds pass under the withdrawing mechanism, and introduces the solidified product into the adjacent second molds of the paired group. In still another embodiment, a withdrawing mechanism withdraws the solidified product from the first molds and transfers the molded product either in an advancing or retarding motion with respect to the motion of the table to the second molds of the pair.

This second product then solidifies as the second molds are advanced by rotation through the solidifying section. A withdrawing unit then withdraws the resulting solidified multiple-product confection units from the second molds, and the confection is transferred for further processing, such as coating if desired, and wrapping and packaging.

In one method of the invention, a first group of molds is provided within a first annular section of a unitized table. A second group of molds, complementary in shape with the first group of molds, receives therein the molded product from the first molds. The second group of molds are within a second annular section of the rotating table. The concentric groups of complementary molds are advanced by rotation through a solidifying section. The group of first molds is filled with a first product; sticks are inserted into the filled first molds. The group of second molds are filled with a sufficient quantity of a second product to fill the spaces in said second molds that are not otherwise occupied when the solidified first product from said first molds is inserted into said second molds. When solid, the solidified molded first products, with the stick inserted, are withdrawn from the first molds and laterally, or radially, transferred from the first molds into the second molds. The introduction of the solidified molded first products into the second molds displaces the flowable second product to thereby fill the spaces existing between the inner wall of the second molds and the outer surface of the first molded products with the flowable second product. When solidified, the resulting multiple-product confection units are withdrawn from the second molds.

In another method of the invention, paired molds are provided within sectors of a unitized rotating table and aligned essentially radially with respect to the rotating table. In the pair, the second group of molds is complementary in shape with the first group of molds and receives therein the molded product from the first molds. The molds are advanced by rotation through a solidifying section. The group of first molds is filled with a first product; sticks are inserted into the filled first molds. The group of second molds are filled with a sufficient quantity of a second product to fill the spaces in said second molds that are not otherwise occupied when the solidified first product from said first molds is inserted into said second molds. When solid, the solidified molded first products, with the stick inserted, are withdrawn from the first molds and laterally, or radially, transferred from the first molds into the second molds. The introduction of the solidified molded first products into the second molds displaces the flowable second product to thereby fill the spaces existing between the inner wall of the second molds and the outer surface of the first molded products with the flowable second product. When solidified, the resulting multiple-product confection units are withdrawn from the second molds.

The invention may also include a unitized table to rotatably advance the paired groups of complementary molds in the course of a production cycle. The first and second filling units which introduce product into the molds may also fill the respective molds with a quantity of respective products during a predetermined period of time (a "time fill"), according to a predetermined volumetric measure (a "volumetric fill") or by a predetermined weight measure (a "weight fill"). The complementary parts of the resulting confections may consist of a variety of different recipes, flavors, colors, textures and/or mix inclusions.

The resulting product is a confection unit of distinct complementary parts consisting of multiple recipes, flavors, colors, textures and/or mix inclusions, wherein separate physical shapes complementarily join with all or part of other physical shapes.

The foregoing and other objects and advantages of the present invention will become more apparent when viewed in light of the accompanying drawings and the following description.

DESCRIPTION OF THE PREFERRED EMBODIMENT(S)

The rotary machine inventions disclosed in co-pending application for U.S. patent Ser. No. 08/206,388 and co-pending application for U.S. patent Ser. No. 08/226,494 disclosed machines for making hardened confections of complementary parts. As can be seen from FIGS. 1 and 3, the present invention is similar but enables the second molds to be filled with a quantity of a second product before, during and/or after the first solidified molded product is introduced into the second molds. In a preferred embodiment, the second molds are filled with a quantity of a second product before the first solidified molded product is introduced into the second molds. This enables the filling unit to use regular filling nozzles to introduce second product into the second molds. The second filling unit introduces a sufficient quantity or volume of second product to fill the volume of the second molds in a measure determined approximately by the volume of the second mold less the predetermined volume of the first mold. The second product should be liquid or flowable to fill spaces in the second molds that are not otherwise occupied by first molded products when said first molded products are inserted therein. When the molded first product is introduced into the second molds containing a predetermined measure of the flowable second product, the molded first product displaces the second product and the spaces in the second molds are thereby filled with second product.

EXAMPLE 1

Figures 1, 1A, 1B:
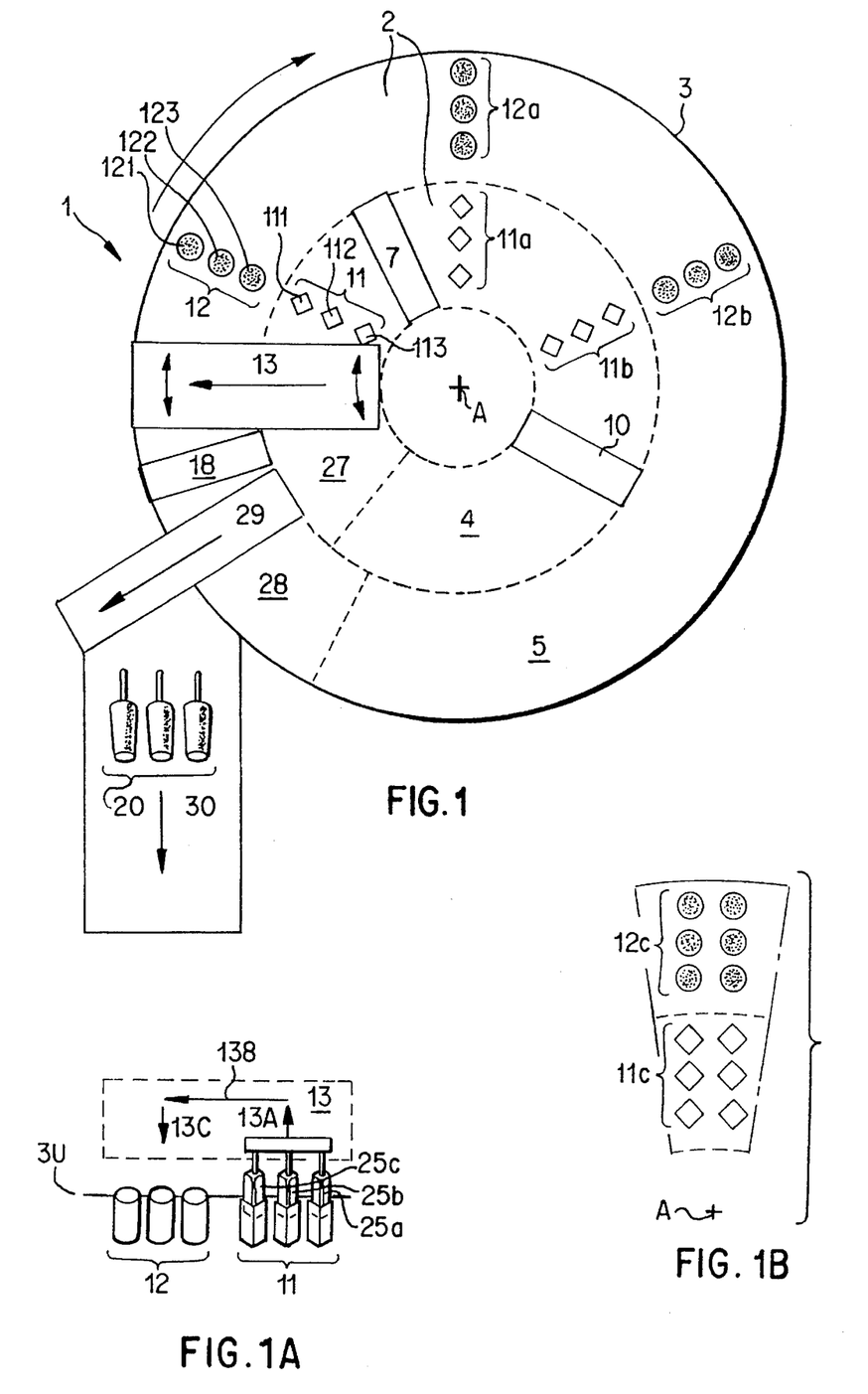
FIG. 1 shows a plan view of an embodiment of the machine for making confection units of complementary parts in accordance with the present invention.
FIG. 1A is a figurative representation showing the withdrawal of molded product from the first molds and its transfer into the second molds in an essentially radial transfer across the annular sections of the rotating table by a withdrawing and transfer mechanism.
FIG. 1B shows a section of an alternate table configuration having multiple sets of mold groups in the annular sections of the rotating table.
Figure 2:
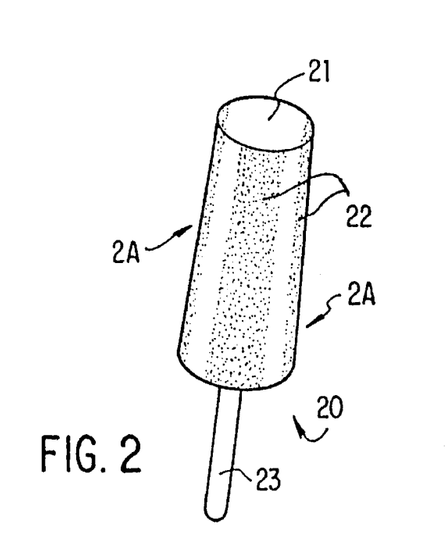
FIG. 2 shows an example of a confection unit produced by the method and machine herein.
Figure 2A:
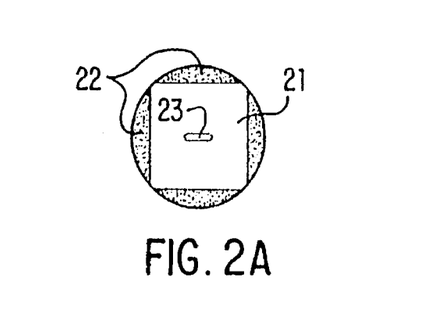
FIG. 2A is a cross-sectional view of the confection unit taken along line 2A—2A of FIG. 2 showing the shapes of the different parts.
Figure 2B:
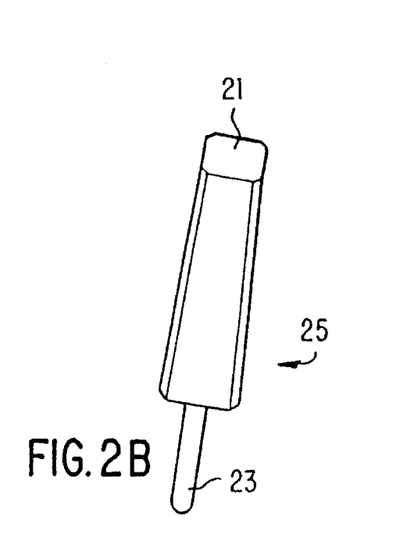
FIG. 2B shows an example of the solidified intermediate product from the first molds produced by the method and machine herein.

Referring now to the drawings, FIG. 1 illustrates an embodiment of the machine 1 of the present invention for making confection units of complementary parts. FIGS. 2 and 2A show the unit confection 20 produced by the invention having an inner core 21 formed by a single mold in a first group of molds in the machine 1 and a complementary second shape 22 foraged by a single mold in a second group of molds in the machine 1. A stick inserted into the confection unit is shown as 23. The stick 23 may be flat, round, or other functional or decorative shape and is formed from wood, polymer, paper or other material as is known in the art. FIG. 2B shows an example 25 of the intermediate product, or inner core, 21 with a stick 23 after the product has been removed from a single mold in a first group of molds.

In FIG. 1, the machine 1 is a rotary machine that comprises a solidifying section 2 through which, as located on or in rotating table 3, concentric groups 11 and 12, 11a and 12a, 11b and 12b, etc., of complementary molds are rotatably advanced in an essentially circular path. The table is preferably planar and horizontally oriented. The individual molds in the groups 11 and 12 are respectively indicated as 111, 112 and 113 and 121, 122 and 123. The individual molds in both groups of molds are preferably tapered so as to facilitate withdrawal of molded product therefrom. The mold groups are in annular sections 4 and 5 of the rotating table and may be aligned radially and may comprise a group of molds in a single line as shown in FIG. 1A at 11 and 12 or in adjacent groupings as shown in FIG. 1B. In FIG. 1B, six molds in each mold group are respectively shown at 11c and 12c in respective annular sections of the table. The solidifying section 2 may be a brine bath, spray system or other mechanism that provides a solidifying or freezing environment, sufficient to harden a confection, such as is known in the art.

The molds in the first group 11 differ from the molds in the second group 12 such that a solidified molded product from the individual molds in the first mold group 11 will fit within the individual molds in the second mold group 12. Groups of molds comparable to groups 11 and 12 may be located on or in the table 3 respectively in the inner section 4 and outer section 5 of the rotating table 3 such as shown as 11a and 12a, 11b and 12b, etc. Also, more than two different groups of radially arranged, concentric, complementary molds may be used to make confections with more than two different recipes, flavors, colors, textures and/or mix inclusions.

With reference to FIG. 1, the machine 1 includes a rotating table 3 having disposed thereon groups of two different types of molds 11 and 12, which respectively produce intermediate product (25 in FIG. 2B) and finished product (20 in FIG. 2). Point A is the axis of rotation of the horizontal rotating table 3. Each of the groups of molds 11 and 12 are disposed with respect to respective filling units 7 and 18 and, after the molds are filled with product, the filled molds pass through a solidifying section 2. During this passage, the product in the molds hardens. Intermediate in the rotational cycle for the groups of molds 11 is a stick inserter 10. The groups of molds 11 and 12 complete a rotational cycle after passing through respective warming sections 27 and 28 which "loosens" solidified product from the molds so it can be removed. Warming sections 27 and 28 may be combined into one warming section.

In a preferred embodiment, the groups of molds are disposed on a circular, flat, horizontal rotating table. A first filling unit 7, for filling the first molds, is operationally disposed at or proximate to a beginning position of a one rotation cycle for the first molds. The first filling unit 7 introduces a liquid product into the first molds when the first molds are positioned under the first filling unit 7. Arctuately disposed with regard to the first filling unit 7, there is a stick-inserting unit 10 designed to insert sticks 23 into the product in the first molds when the product starts to solidify during the rotational cycle.

When the second molds are positioned beneath the second filling unit 18, the second filling unit 18 introduces a sufficient quantity or volume of second product to fill the volume of the second mold in a measure determined approximately by the volume of the second mold less the predetermined volume of the mold in the first group. The second product should be liquid or flowable to fill spaces in the second molds that would not be otherwise occupied by first molded products when said first molded products are inserted therein. The introduction of the quantity of the second product may occur before, during and/or after the transfer of solidified product from said first molds into said second molds, but the introduction of the second product is preferred to occur before or during the transfer of solidified product from said first molds into said second molds. The spaces that are filled may be spaces existing between the inner wall of the second molds and the molded product transferred from the first molds into the second molds. The second filling unit 18 may fill the second molds with a quantity of the second product according to a predetermined time fill, volumetric fill or weight fill. The second product is of a different recipe, flavor, color, texture and/or mix than the first product that is introduced by the first filling unit 7.

The product in the first molds is solidified by the time the molds reach the withdrawing and transfer mechanism 13, which is located before the end of the rotational cycle of the first molds and at approximately the beginning of the rotational cycle of the second molds. At this point, both the filled group of first molds and the corresponding group of second molds are positioned, essentially radially aligned with respect to the axis of the table, at the withdrawing and transfer mechanism 13 at the same time. The location of the withdrawing and transfer mechanism 13 may correspond generally to the beginning of the one rotation cycle for the second molds.

At the withdrawing and transfer mechanism 13, as illustrated in FIG. 1A, the solidified products 25a, 25b and 25c in the first molds 11, as a group, are loosened from the molds after passing through the warming section. The product is removed from the first molds 11 and transferred into the second molds 12 which are sized such as to receive therein the frozen product 25 of the first molds. To facilitate withdrawal of the frozen product 25 from the first molds, the outer surfaces of the first molds are subjected to "warming" in a manner known in the art, for example, by the aid of brine, air or other fluid at a given temperature introduced from below the molds. A warming brine spray section, through which the first molds are advanced, is positioned in FIG. 1 at 27.

In FIG. 1A, the transfer of first molded product 25a, 25b and 25c, as a group, from first mold group 11 to second mold group 12 is effected by grasping the inserted sticks 23 and withdrawing the product 25 up and out of the first molds 11, then shifting the product radially across the upper table surface 3U to position 25a, 25b and 25c over second mold group 12. The product 25 is then lowered, dropped or inserted into the second molds 12, essentially following the narrowed sequence up, across and down, as shown by 13A, 13B, and 13C. The mechanism is then recycled for the next mold group 11a, etc.

If the withdrawal and transfer occurs when rotational movement of the table is stopped, the transfer is in a straight axial movement. When the table is stopped and before, during and/or after this transfer, the second filling unit 18 may introduce second product into the second molds. If, however, the transfer occurs as the table rotates, the movement by the transfer mechanism is coordinated with the table rotation such that the transfer operation is conducted according to a reciprocating time and positional sequence in correspondence with the table rotation and angular mold separation. When the table is rotating and before, during and/or after this transfer, the second filling unit 18 may introduce second product into the second molds.

The withdrawal of the molded products from the group of first molds and the transfer of the molded first product into the group of second molds occurs while most of the other groups of complementary first and second molds contain product therein. The transfer of the molded first product from the first molds to the corresponding complementary second molds is an essentially radial transfer in this embodiment.

The molded first products from the first molds are sized to fit within the second molds and may or may not contact the inner walls of the second molds. Product from the first molds may also have shapes with cross-sections that do not contact the inner side wall of the second molds except at the bottom. In this situation, mechanical supports may be provided by which the molded first products from the first molds are held upright in the second molds. This allows the molded first product to stand upright in the second molds while allowing the liquid or flowable second product from the second filling unit to fill the space existing between the inner wall of the second molds and the molded first product from the first molds by displacement.

After the second molds are filled by the second filling unit 18 and the molded first product is inserted into the second molds, the filled second molds are rotatably advanced through the solidifying section 2 to solidify the introduced flowable second product. To facilitate withdrawal of the resulting solidified multi-part confections from the second molds, the second molds are "warmed" in a manner as noted above, for example, by the aid of a spray or bath of brine or other fluid directed from below the molds in the warming section 28 through which the second molds are advanced. Then a second withdrawing unit 29 withdraws the confections from the second molds. Withdrawing and transfer mechanism 29 essentially corresponds in structure and operation to either intermittent or continuous operation of unit 13 as described above.

Figure 1C:
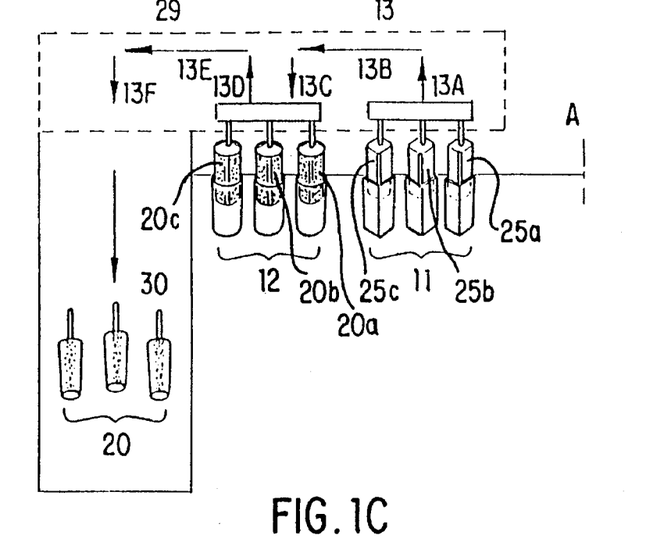
FIG. 1C illustrates the action of a single unit withdrawal and transfer mechanism transferring intermediate product to the second molds and transferring finished molded products to a chute or conveyor.

Mechanism 29 may be combined with unit 13, whereby finished confection units 20a, 20b and 20c are withdrawn from molds 12 and deposited on a chute or conveyor 30 in an up, across and down movement as shown by 13D, 13E and 13F in FIG. 1C essentially simultaneously as the intermediate products 25a, 25b and 25c are shifted from mold group 11 to mold group 12 in arrowed sequence 13A, 13B and 13C in FIG. 1C. The confections 20 are transported to a conventional wrapping and packaging station in a manner known in the art, such as with a chute or conveyor 30.

EXAMPLE 2

Figure 3:
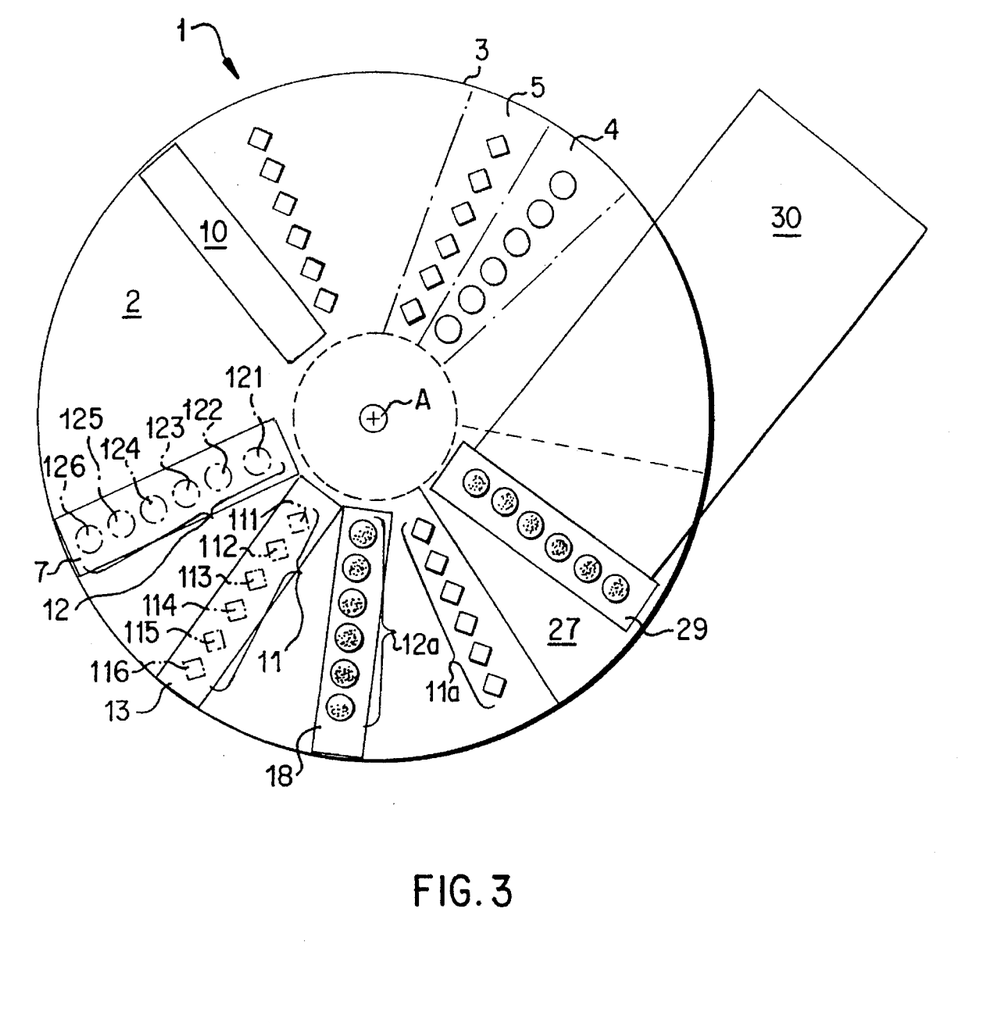
FIG. 3 shows a plan view of another embodiment of the machine for making confection units of complementary parts in accordance with the present invention.

Referring now to the drawings, FIG. 3 illustrates an embodiment of the machine 1 of the present invention for making confection units of complementary parts. Like Example 1, an example of a unit confection 20 produced by the invention is shown in FIGS. 2 and 2A. FIG. 2B shows an example 25 of the intermediate product, or inner core, 21 with a stick 23 after the product has been removed from a single mold in a first group of molds.

Figure 3A:
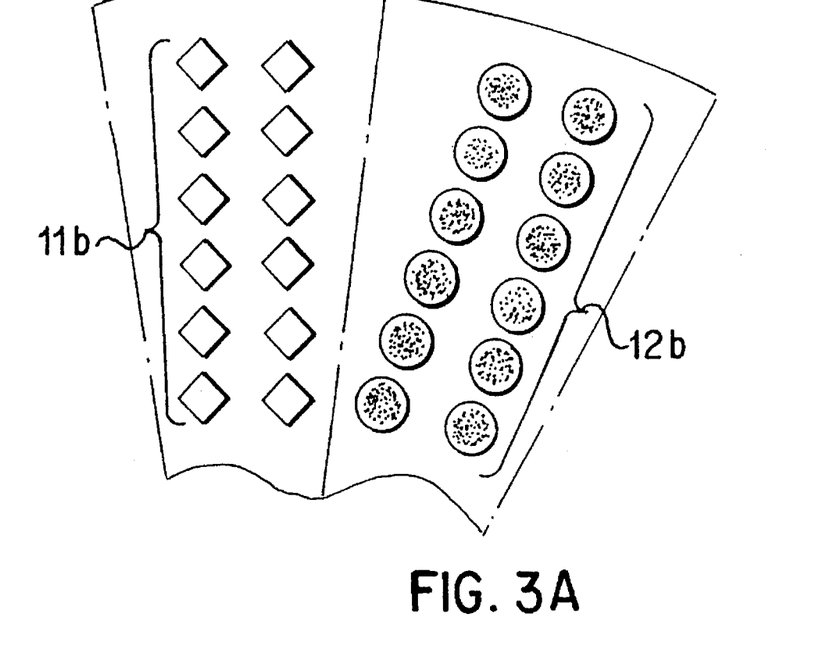
FIG. 3A shows a section of an alternate table configuration having multiple sets of mold groups aligned together essentially radially with respect to the rotating table.

In FIG. 3, the machine 1 is a rotary machine that comprises a solidifying section 2 through which, as located on or in rotating table 3, paired groups 11 and 12, 11a and 12a, etc., of complementary molds are rotatably advanced in an essentially circular path. The table is preferably planar and horizontally oriented. The individual molds in the groups 11 and 12 are respectively indicated as 111, 112, 113, 114, 115 and 116 and 121, 122, 123, 124, 125 and 126. The individual molds in both groups of molds are preferably tapered so as to facilitate withdrawal of molded product therefrom. The mold groups are shown in sectors 4 and 5 of the rotating table 3 and are aligned essentially radially. The mold groups may be in a single line as shown in FIG. 3 at 11 and 12 or in adjacent groupings as shown in FIG. 3A. In FIG. 3A, twelve molds in each mold group are respectively shown at 11*b* and 12*b* in respective sectors of the table. The solidifying section 2 may be a brine bath, spray system or other mechanism that provides a solidifying or freezing environment, sufficient to harden a confection, such as is known in the art. A sufficient temperature of brine for solidifying product in the molds is typically −45° F. to −50° F.

The molds in the first group 11 differ from the molds in the second group 12 such that a solidified molded product from the individual molds in the first mold group 11 will fit within the individual molds in the second mold group 12. Groups of molds comparable to groups 11 and 12 may be located on or in the rotating table 3. Also, more than two different groups of radially arranged, complementary molds may be used to make confections with more than two different recipes, flavors, colors, textures and/or mix inclusions.

With reference to FIG. 3, the machine 1 includes a rotating table 3 having disposed thereon groups of two different types of molds 11 and 12, which respectively produce intermediate product (25 in FIG. 2B) and finished product (20 in FIG. 2). Point A is the axis of rotation of the horizontal rotating table 3. Each of the groups of molds 11 and 12 are disposed with respect to respective filling units 7 and 18 and, after the molds are filled with product, the filled molds pass through a solidifying section 2. During this passage, the product in the molds hardens. Intermediate in the rotational cycle for the groups of molds 11 is a stick inserter 10. The groups of molds 11 and 12 complete a rotational cycle after passing through a warming section 27 which "loosens" solidified product from the molds so it can be removed.

In a preferred embodiment, the paired groups of molds are disposed on a circular, flat, horizontal rotating table 3. A first filling unit 7, for filling the first molds 11, is operationally disposed at or proximate to a beginning position of a one rotation cycle for the first molds. The first filling unit 7 introduces a flowable product into the first molds when the first molds are positioned under the first filling unit 7. Arcuately disposed with regard to the first filling unit 7, there is a stick-inserting unit 10 designed to insert sticks 23 into the product in the first molds while the product is solidifying during the rotational cycle.

When the second molds are positioned beneath the second filling unit 18, the second filling unit 18 introduces a sufficient quantity or volume of second product to fill the volume of the second mold in a measure determined approximately by the volume of the second mold less the predetermined volume of the mold in the first group. The second product should be liquid or flowable to fill spaces in the second molds that are not otherwise occupied by first molded products when said first molded products are inserted therein. The introduction of the quantity of the second product may occur before, during and/or after the transfer of solidified product from said first molds into said second molds, but the introduction of the second product is preferred to occur before or during the transfer of solidified product from said first molds into said second molds. The spaces that are filled may be spaces existing between the inner wall of the second molds and the molded product transferred from the first molds into the second molds. The second filling unit 18 may fill the second molds with a quantity of the second product according to a predetermined time fill, volumetric fill or weight fill. The second product is of a different recipe, flavor, color, texture and/or mix than the first product that is introduced by the first filling unit 7.

The product in the first molds is solidified by the time the molds reach the withdrawing and transfer mechanism 13, which is located before the end of the rotational cycle of the first molds. The warming section 27 "loosens" the solidified product in the first molds so the product can be removed by the withdrawing and transfer mechanism 13, which is located after the warming section 27 in the rotation path and at approximately the beginning of the rotational cycle of the second molds 12. To facilitate withdrawal of the frozen product 25 from the first molds, the outer surfaces of the first molds are subjected to "warming" in a manner known in the art, for example, by the aid of brine, air or other fluid at a given temperature introduced from below the molds. A warming brine spray section, through which the molds are advanced, is positioned in FIG. 3 at 27.

Figure 3B:
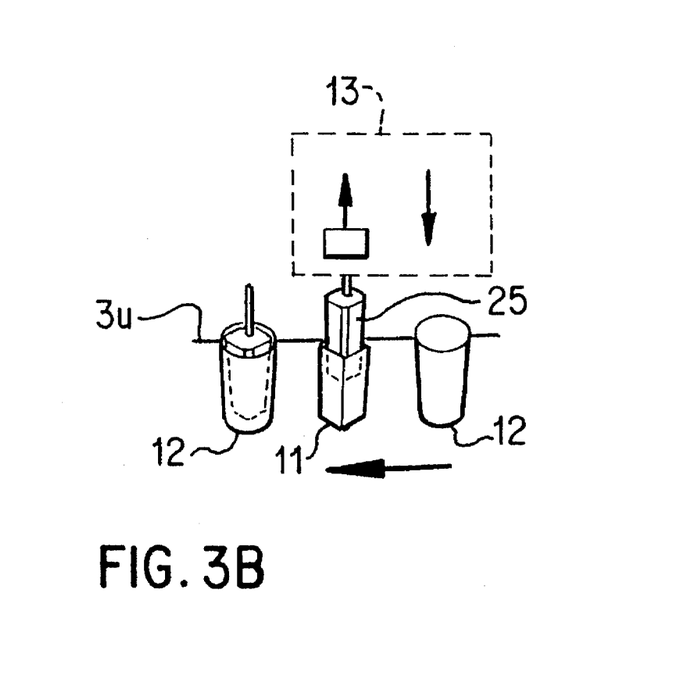
FIG. 3B illustrates the action of the first withdrawal mechanism transferring solidified product of the first molds to the second molds.

At the withdrawing and transfer mechanism 13, the product is removed from the first molds 11 and introduced into the second molds 12 which are sized such as to receive therein the frozen product 25 of the first molds. The transfer of first molded products, as a group, from first mold group 11 to second mold group 12 is illustrated in FIG. 3B. The mechanism 13 grasps the inserted sticks 23 and withdraws the product 25 up and out of the first molds 11, waiting until the second molds 12, containing flowable second product, pass under the withdrawing and transfer mechanism 13 due to rotation of the rotating table 3, and introducing the solidified product 25 into the second molds 12 by lowering, dropping or inserting the solidified product 25 into the second molds 12, which thereby displaces the flowable second product to fill spaces between the inner surface of the second molds and the molded first product.

In another embodiment, the transfer of first molded products, as a group, from first mold group 11 to second mold group 12 is effected by grasping the inserted sticks 23 and withdrawing the product 25 up and out of the first mold 11, then shifting the product essentially concentrically, either in an advancing or retarding motion, across the upper table surface 3U to a position over the second molds 12 containing flowable second product. The product 25 is then lowered, dropped or inserted into the second molds 12, which thereby displaces the flowable second product to fill spaces between the inner surface of the second molds and the molded first product. The mechanism is then recycled for the next mold group 11*a*, etc. In this latter embodiment, if the withdrawal and transfer occurs when rotational movement of the table is stopped, the transfer is essentially concentric. If, however, the transfer occurs as the table rotates, the movement by the transfer mechanism is coordinated with the table rotation such that the transfer operation is conducted according to a reciprocating time and positional sequence in correspondence with the table rotation and angular mold separation.

The molded products from the first molds 11 are sized to fit within the second molds and may or may not contact the inner walls of the second molds 12. Product from the first molds may also have shapes with cross-sections that do not contact the inner side wall of the second molds. In this situation, mechanical supports may be provided by which the molded products from the first molds are held upright in the second molds. This allows the molded product to stand upright in the second molds while allowing the liquid or flowable second product from the second filling unit to fill the space existing between the inner wall of the second molds and the molded product from the first molds by displacement.

After the second molds are filled by the second filling unit 18, the filled molds are rotatably advanced through the solidifying section 2 to solidify the introduced second liquid product. To facilitate withdrawal of the resulting solidified multi-part confections from the second molds, the second molds are "warmed" in a manner as noted above, for example, by the aid of a spray or bath of brine or other fluid directed from below the molds in the warming section 27 through which the second molds are advanced. In another embodiment, a second warming section, independent of warming section 27, may be used to warm the second molds. Then a withdrawing mechanism 29 withdraws the confections 20 from the second molds. Withdrawing mechanism 29 essentially corresponds in structure and operation to either intermittent or continuous operation of unit 13 as described above. The confections 20 are transported to a conventional wrapping and packaging station in a manner known in the art, such as with a chute or conveyor 30.

Figure 5:
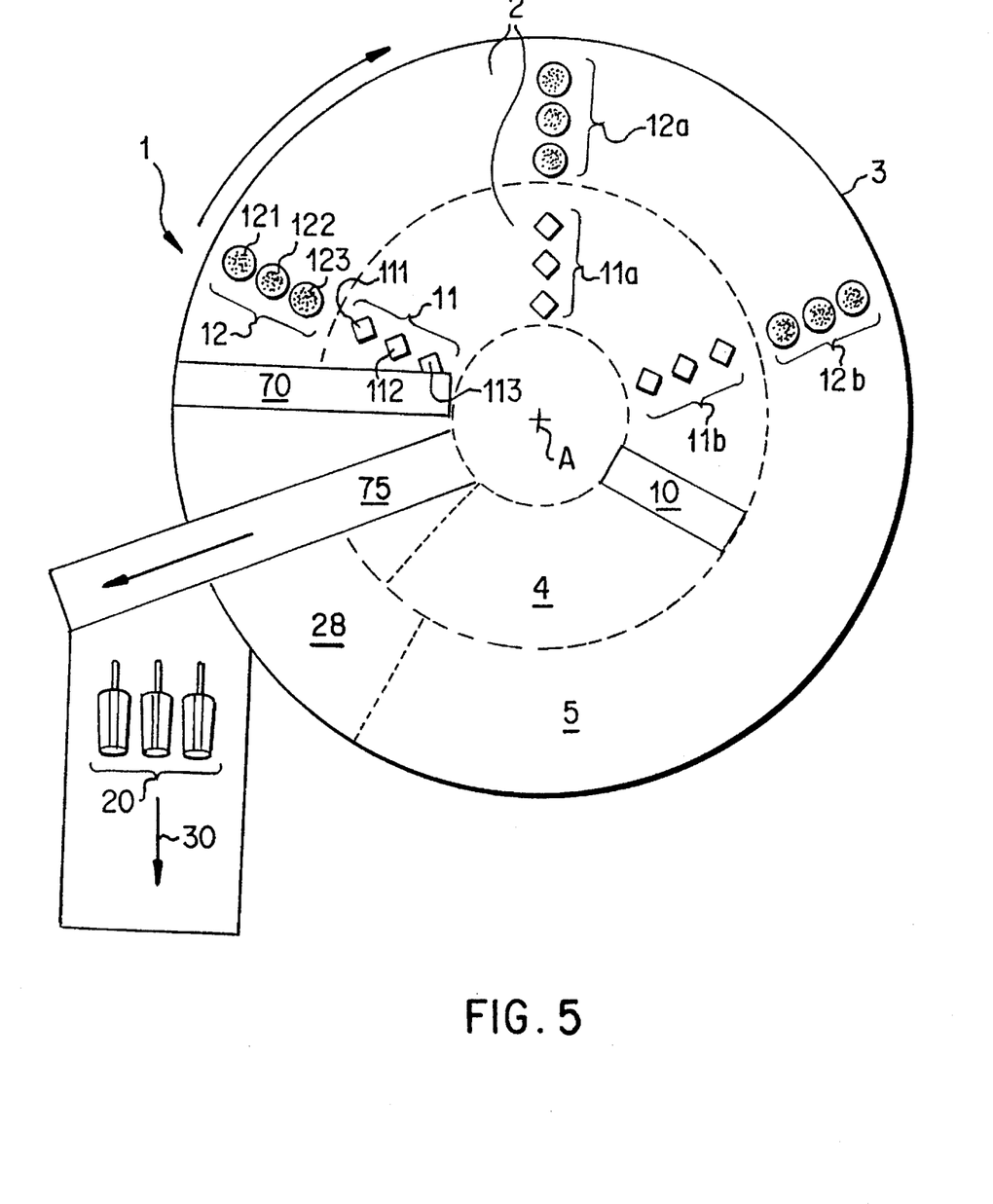
FIG. 5 shows a plan view of another embodiment of the machine for making confection units of complementary parts in accordance with the present invention.
Figure 6:
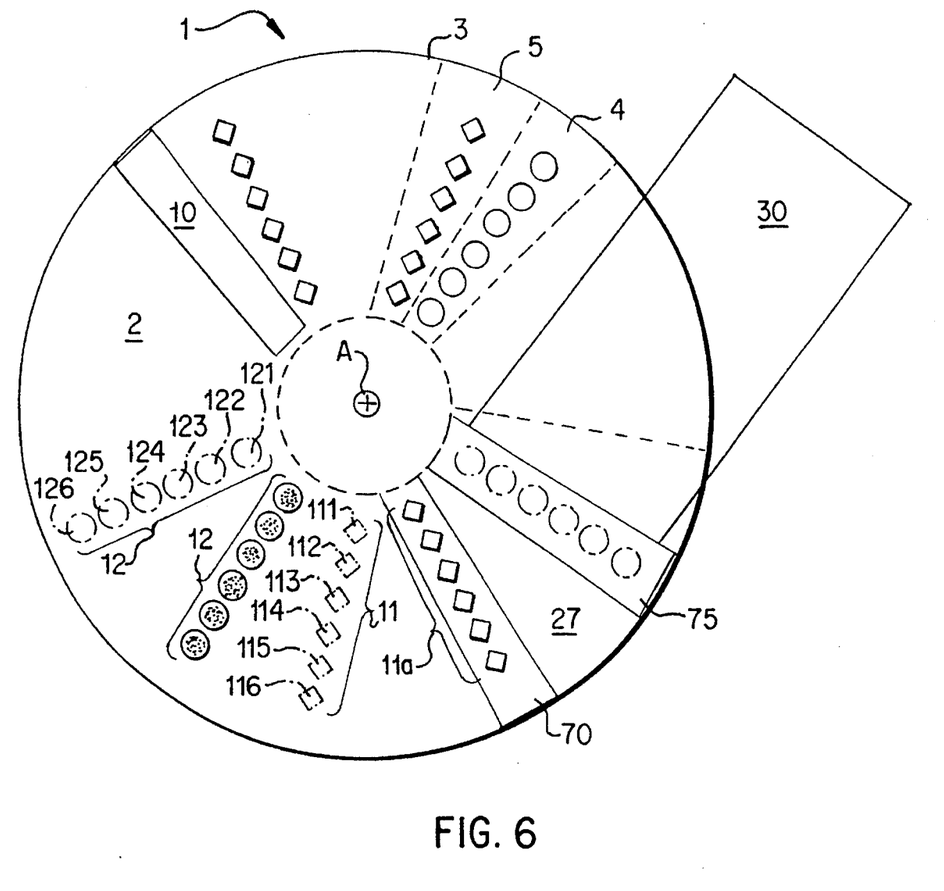
FIG. 6 shows a plan view of another embodiment of the machine for making confection units of complementary parts in accordance with the present invention.

FIGS. 5 and 6 show other embodiments of the present invention to produce unit confections of complementary parts. These embodiments are similar to the other embodiments discussed above, however, these embodiments have one filling unit 70 and one withdrawing and transfer mechanism 75. The filling unit 70 introduces a first product into the first molds and a sufficient quantity of a second product into the second molds to fill spaces in the second molds that are not otherwise occupied by first molded products when said first molded products are inserted therein. The filling unit 70 is located at a position on the machine 1 where the filling unit 70 is capable of filling first molds before or while the first molds are advanced through the solidifying section 27 and/or 28 and where the filling unit 70 is capable of filling second molds at a time before, during and/or after the transfer of solidified product from the first molds into the second molds.

The embodiments shown in FIGS. 5 and 6 have one withdrawing and transfer mechanism 75 for withdrawing solidified product from the first molds and for transferring said withdrawn product into said second molds, and for withdrawing the confections from said second molds after the second product solidifies and transferring the confections 20 from the machine 1 to a chute or conveyor 30.

In the embodiments discussed in this specification, including those in the examples, after the product is removed from the first molds, the first molds do not remain empty until the corresponding confection of complementary parts is withdrawn from the second molds at the end of another rotational cycle. Instead, the first molds are fairly promptly refilled by the first filling unit 7 or filling unit 70 and the process continues as stated above for the first molds while the second molds with first molded product and second product therein are being solidified and removed during the rotational cycle. Thus the groups of molds in the inner and outer sections of the rotary machine are used at a high efficiency throughout the rotational cycle. This is an improvement in efficiency over chain-conveyor parallel row machines in which more than one half of the molds remain empty during a product forming cycle. As a consequence, the rotary machine requires fewer molds to process the same capacity of ice confections than chain-conveyor parallel row machines. In addition, the rotary machine continuously performs in a cyclical rotational cycle of the unitized circular table. Time, temperature and specific rotational cycles are determined by the hardening and/or freezing characteristics of the product introduced into the molds and can be determined by those familiar with recipe requirements.

The resulting products from the machine 1 and method as described above and shown in FIG. 2 and 2A are confections of complementary parts, wherein the complementary parts consist of visually or gustatorily distinct shapes, recipes, flavors, colors, textures and/or mix inclusions. Many different variations of arbitrary shape configurations are obtainable, some of which are shown in the aforementioned '080 patent. By varying the shapes of the first and second molds, and as long as the molded product from the first molds fits within the cross-section of the corresponding second molds, many variously shaped confections of complementary parts can be formed. The confections may also be coated with chocolate and/or other coatings, by spraying or dipping the units into a final bath of a given product, as is known in the art.

Figure 4:
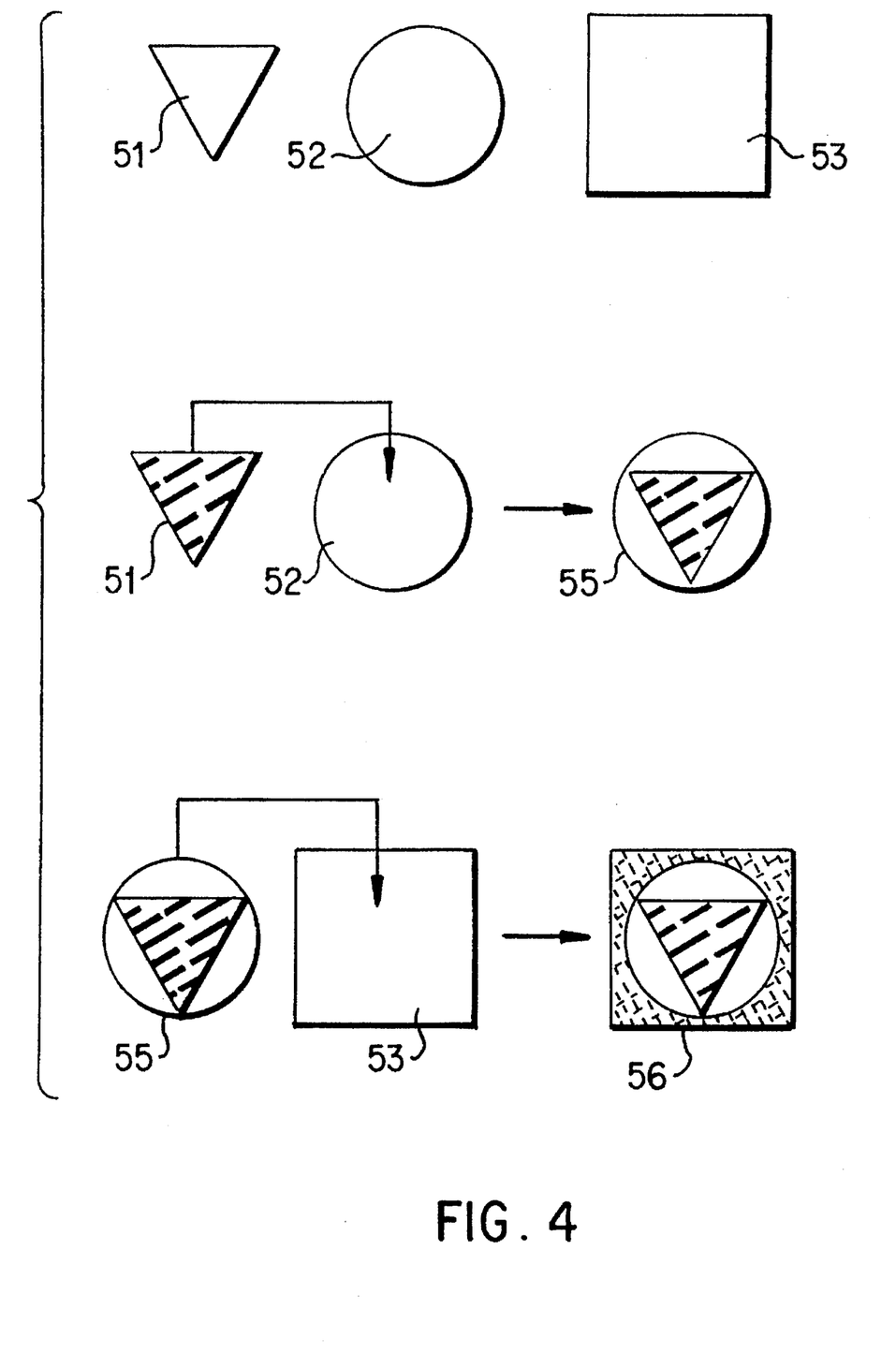
FIG. 4 shows an example of "paired" groups of molds where more than two shapes are provided to make a confection unit.

As used herein, "paired" refers to the respective sequential transfer of a product from a mold to a successive mold. A "pair" is not limited to two shapes in the production of a finished product. FIG. 4 shows, in cross-section, an example in which three different shapes 51, 52 and 53 are used to form a resulting three-product confection 56. The finished product 56 is formed from a first paired product 55, which is itself a formed product of two shapes, inserted into a third shaped mold 53. Mold 53 is "paired" with the first paired shape 55, which is formed from paired molds 51 and 52.

The example shown in FIG. 4 may involve red, white and blue colors, or chocolate, vanilla and strawberry flavors, corresponding to respective shapes 51, 52 and 53. In this scenario, the first paired product 55 consists of a circular product 52 molded in a second mold group around a triangular shaped product 51 formed in a first mold group. The first paired product 55 (from the first mold group of the second "pair") is inserted into a third shaped mold 56 (the second mold group of the second "pair") to form a finished product consisting of, in cross-section, a square surrounding a circle surrounding a triangle.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

What is claimed is:

1. A machine for making hardened confections of complementary parts comprising:

at least two groups of complementary molds, the groups including a group of first molds for producing a solidified physical shape which fits within the molds in a group of second molds, the groups of molds being cooperatively arranged on a rotary table;

at least one solidifying section through which the groups of first molds and second molds are advanced;

at least one filling unit for introducing a quantity of first product to fill the first molds, and introducing a quantity of a second product to fill the second molds in an amount predetermined approximately by the volume of the second molds less the volume of the first filled molds, the filling unit being located at a position on the machine whereby the first molds are filled at a time that is at least one of before and during the advance of the first molds into and through the solidifying section, the filling unit further being disposed to fill the second molds at a time that is at least one of before, during and after the transfer of solidified product from the first molds into the second molds;

a stick inserter for inserting a stick into the first product in the first molds; and at least one withdrawing and transfer mechanism for withdrawing solidified product from the first molds and for transferring the withdrawn product into the second molds, and for withdrawing the confections from the second molds after the second product solidifies and transferring the confections from the machine.

2. The machine of claim 1 in which a filling unit is disposed to fill the second molds with the predetermined amount of the second product before the solidified first product is introduced therein.

3. The machine of claim 1 in which a filling unit is disposed to fill the second molds with the predetermined mount of the second product while the solidified first product is introduced therein.

4. The machine of claim 1 in which a filling unit is disposed to fill the second molds with the predetermined amount of the second product after the solidified first product is introduced therein.

5. The machine of claim 1 in which a filling unit is disposed to fill the second molds with the predetermined amount of the second product during a time period extending from before to during the transfer of the solidified first product into the second molds.

6. The machine of claim 1 in which a filling unit is disposed to fill the second molds with the predetermined amount of the second product during a time period extending from during to after the transfer of the solidified first product into the second molds.

7. The machine of claim 1 in which a filling unit is disposed to fill the second molds with the predetermined amount of the second product during a time period extending from before to after the transfer of the solidified first product into the second molds.

8. The machine of claim 1 in which the groups of molds are ganged radially and concentrically with respect to each other, and the withdrawing and transfer mechanism transferring solidified product from the first molds to the second molds transfers the product radially with respect to the table.

9. The machine of claim 1 in which the groups of molds are arranged so as to alternate between groups of first molds and groups of second molds in radial positions on the rotary table.

10. The machine of claim 1 further comprising a drive mechanism for advancing groups of first molds paired with groups of second molds through the solidifying section.

11. The machine of claim 1 further including a warming section located proximate to the end of the rotation cycle of each of the first molds and second molds.

12. A machine for making hardened confections of complementary parts, comprising:

a unitized table that is horizontally disposed and operatively connected to a drive mechanism for rotatably advancing groups of molds about a central axis with respect to a predetermined rotation cycle;

at least two groups of complementary molds provided as a paired group within a section of the unitized table, the paired group including a group of first molds for producing a physical shape which complementarily joins with all or part of the physical shape produced by molds in a group of second molds within which the shapes produced by the first molds fit, the first and second groups of molds being further arranged radially with respect to a central axis of the table;

at least one solidifying section through which the paired groups of first molds and second molds are each advanced by rotation;

a first filling unit for introducing a quantity of first product into the first molds to fill said first molds, the first filling unit being operationally disposed at or proximate to a position defining a beginning of one rotation cycle;

a stick inserter located above the advancement path of the first molds and positioned with respect to the rotational path of the first molds such that sticks are introduced therein before or during the hardening of the first product;

a second filling unit for introducing a quantity of a second product into the second molds in an amount predetermined approximately by the volume of the second molds less the volume of the first filled molds, the second filling unit being located at a position on the machine whereby the first molds are filled at a time that is at least one of before or during the advance of the first molds through the solidifying section, the second filling unit further being disposed to fill the second molds at a time that is at least one of before, during and after the transfer of solidified product from the first molds into the second molds;

a first withdrawing mechanism for withdrawing solidified first product from the first molds and for introducing the withdrawn molded product into the second molds, the second molds containing second product that is at least partially displaced upon the introduction of solidified first product; and a second withdrawing mechanism for withdrawing product from the second molds after the second product solidifies.

13. The machine of claim 12 in which the groups of molds are arranged radially and concentrically with respect to each other, and the withdrawing and transfer mechanism transferring solidified product from the first molds to the second molds transfers the product radially with respect to the table.

14. The machine of claim 12 in which the groups of molds are arranged so as to alternate between groups of first molds and groups of second molds in radial positions on the rotary table.

15. A method of making hardened confections of complementary parts comprising:

providing a group of first molds within a first section of a unitized rotary table;

providing a group of second molds complementary in shape with the first molds, within which product molded in the first molds fits, within a second section of the rotary table, the group of first molds and second molds being a paired group;

causing the groups of first molds and second molds to advance by rotation through an environment in which product introduced into the molds is solidified;

filling the first molds with a first product;

filling the second molds with a quantity of a second product in an amount predetermined approximately by the volume of a second mold less the volume of the product molded in a first mold, whereby space in the second molds not occupied by the volume of the product molded in the first molds is filled by reason of the displacement of the second product by the volume occupied in the mold by the first molded product;

withdrawing solidified first product from the first molds and introducing the solidified first product into the second molds before the second product in the second molds solidifies; and withdrawing the molded product from the second molds when the molded product is solidified.

16. The method of claim 15 further comprising the step of filling the first molds with a quantity of the first product determined by at least one means from the group consisting of a predetermined period of time, a predetermined volumetric measure and a predetermined weight measure.

17. The method of claim 15 further including the step of inserting a stick into the first product in the first molds.

18. The method of claim 15 further including the step of warming the molds before the solidified product therein is withdrawn.

19. A rotary machine for making unit confections of complementary parts which consist of different recipes, flavors, colors, textures and/or mix inclusions comprising paired groups of complementary molds arranged in or on sections of a rotating table, in which a group of first molds arranged in a first section produces physical shapes of a first recipe, flavor, color, texture and/or mix inclusion which fit within and complementarily join all or part of the physical shapes of differing recipe, flavor, color, texture and/or mix inclusion produced in a group of second molds arranged in a second section, whereby the first physical shapes displace the volume of the second molds not occupied by the first physical shapes such that the second molds are capable of being filled with second product in an amount determined by the volume of the second mold less the volume of the first molded product.

* * * * *